(12) United States Patent
Nielsen et al.

(10) Patent No.: US 7,991,737 B2
(45) Date of Patent: Aug. 2, 2011

(54) SYNCHRONIZATION OF RECORDS OF A TABLE USING BOOKMARKS

(75) Inventors: Mogens Nielsen, Ballerup (DK); Tsvi M. Reiter, Copenhagen (DK); Julia Lisovaya, Kokkedal (DK); Oliver Morrison, Copenhagen (DK)

(73) Assignee: Microsoft Corporation, Redmond, WA (US)

( * ) Notice: Subject to any disclaimer, the term of this patent is extended or adjusted under 35 U.S.C. 154(b) by 561 days.

(21) Appl. No.: 12/204,703

(22) Filed: Sep. 4, 2008

(65) Prior Publication Data

US 2010/0057689 A1    Mar. 4, 2010

(51) Int. Cl.
*G06F 7/00* (2006.01)
*G06F 17/00* (2006.01)

(52) U.S. Cl. .................... 707/613; 707/614
(58) Field of Classification Search .......... 707/613, 707/614

See application file for complete search history.

(56) References Cited

U.S. PATENT DOCUMENTS

| | | | |
|---|---|---|---|
| 5,594,898 A | 1/1997 | Dalal et al. | |
| 5,666,526 A | 9/1997 | Reiter et al. | |
| 6,212,522 B1 | 4/2001 | Himmel et al. | |
| 6,516,327 B1 * | 2/2003 | Zondervan et al. | 1/1 |
| 6,725,227 B1 | 4/2004 | Li | |
| 7,225,189 B1 | 5/2007 | McCormack et al. | |
| 2006/0282765 A1 | 12/2006 | Hintermeister et al. | |
| 2007/0299816 A1 | 12/2007 | Arora et al. | |
| 2008/0040313 A1 | 2/2008 | Schachter | |

OTHER PUBLICATIONS

"JetComp.exe Readme File," 7 pages, http://www.petadmin.com/downloads/jetcomp.doc#_Toc494622165 [last accessed Mar. 23, 2009].
"What is IB Objects?" Apr. 28, 2008, 13 pages, http://www.ibobjects.com/ibowhatis.html [last accessed Mar. 23, 2009].
Microsoft.com printout, "Client-Server Application Development using Microsoft Access," Apr. 28, 2008, 21 pages.
Microsoft.com printout, "File: DBGRIDUB.EXE uses DBGRID in an Unbound Mode," Apr. 28, 2008, 12 pages, http://support.microsoft.com/kb/140021 [last accessed Mar. 23, 2009].

* cited by examiner

*Primary Examiner* — John R. Cottingham
*Assistant Examiner* — Mariela D Reyes
(74) *Attorney, Agent, or Firm* — Perkins Coie LLP

(57) ABSTRACT

A method and system for controlling an application server in order to provide application services to clients while maintaining synchronization between records of tables of a database server. An application server retrieves records of tables and stores them locally on the application server. When a client requests some fields of a record of a table, the application server generates a bookmark that uniquely identifies the record. The bookmark may contain a table identifier and a record identifier or a query identification and an identifier of a record within the query result. The bookmark is opaque to the client and only the application server need know how to interpret its contents. When the application server provides the requested fields of the record to the client, it also provides the record bookmark to the client. When the client wants to identify the record, it uses the bookmark provided by the application server.

20 Claims, 11 Drawing Sheets

FIG. 1 record bookmark  210 query bookmark  220 draft bookmark  230 temporary bookmark  240

SYNCHRONIZATION OF RECORDS OF A TABLE USING BOOKMARKS

BACKGROUND

Enterprise Resource Planning (ERP) refers to the field of integrating most of the data and processes of an organization into a unified system. A typical ERP system uses multiple components of computer software and hardware to achieve the integration. Most ERP systems use a unified database to store data for the various system components. Prior to using an ERP system, most organizations used separate applications for accounting, human resources, and other business functions. ERP systems typically attempt to cover all of the basic functions of an organization, regardless of the organization's business or charter. For example, ERP systems may cover manufacturing, warehousing, logistics, information technology, accounting, human resources, marketing, payroll, and strategic management. Business, nonprofit organizations, nongovernmental organizations, governments, and other organizations utilize ERP systems.

The unified database of an ERP system contains various database tables for storing different types of data for an organization. For example, one database table may store customer information (e.g., customer name and address), and another table may store inventory information (e.g., product name and back-order status). Each database table contains records (e.g., rows) that have various fields (e.g., columns). The data of each record is stored as field values in the fields. For example, a customer database table may have a customer name field and one record may contain "Acme" as its field value. A database table may have the attribute that its records are each associated with a field or a combination of fields whose values uniquely identify the record. For example, a customer database table may use the combination of customer name and zip code fields to uniquely identify each record. In such a case, the database system would allow multiple records with the same customer name to be in the customer database table as long as their zip codes are different. Thus, the database system would allow the records for "Acme/98199" and "Acme/92335" to be stored in the customer table but not two records for "Acme/98199." The combination of fields that uniquely identifies a record is referred to as the "key" of the database table and the fields of the combination are referred to as "key fields."

Typical ERP systems provide a two-tier (or client/server) architecture in which a client-side component that implements the functionality of the ERP system interfaces with a database server that provides access to the unified database. The client-side component may provide user interface, run-time, and design-time functionality of the ERP system. When the client-side component retrieves a set of records from the database server, the records can be shared between software that implements the different functionalities of the ERP system. If a three-tier architecture were to be used, then the functionality of the client-side component might be distributed between a UI client and an application server, which interfaces with the database server. In such a case, the records of the database cannot be as easily shared between the UI client and the application server because both the UI client and the application server may need to access the same record at the same time.

With such a three-tier architecture, the application server provides a run-time environment that interfaces with the database server and executes the applications of the ERP system. The UI client interfaces with the application server and controls the user interface. Since both the UI client and the application server need access to the records of the database, both require the ability to modify the records, change position within a table, and otherwise manipulate the records independently of the other. Since each can change the records of the database independently of the other, the UI client's and the application server's view of a record may be inconsistent. For example, if the UI client changes the value of a field of a record, the application server's view of that record may be of the unchanged value.

SUMMARY

A method and system for controlling an application server in order to provide application services to clients while maintaining synchronization between records of tables of a database server is provided. An application server retrieves records of tables from the database server and stores them locally on the application server. When a client requests some fields of a certain record of a certain table, the application server may have that record already stored locally or may need to retrieve that record from the database server. The application server generates a record bookmark from the values of the data field of the requested record. A record bookmark may include a table identifier, which identifies the database table of the record, and a record identifier, which is derived from the values of the key fields of the record. When the application server provides the requested fields of the record to the client, it also provides the record bookmark to the client. When the client wants to modify the field value of a record, it sends to that application server a modify request that includes the new field value and the bookmark provided by the application server. When the application server receives the record bookmark, it identifies from the record bookmark the database table and the record of the database table that is to be modified. The application server then modifies its local copy of the identified record.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for controlling an application server in order to provide application services to clients while maintaining synchronization between records of tables of a database server is provided. In some embodiments, an application server retrieves records of tables from the database server and stores them locally on the application server. For example, the application server may retrieve records of a customer table for customers within the state of New York and store those records in a local customer table. When a client requests some fields of a record of the customer table for a certain customer (e.g., uniquely identified by customer name and zip code), the application server may have that record already stored locally or may need to retrieve that record from the database server. The application server generates a record bookmark from the values of the data field of the requested record. A record bookmark may include a table identifier, which identifies the database table of the record, and a record identifier, which is derived from the values of the key fields of the record. For example, a table identifier may identify the customer table, and a record identifier for a customer record may be a concatenation of the customer name and zip code. When the application server provides the requested fields of the record to the client, it also provides the record bookmark to the client. The record bookmark is "opaque" to the client in the sense that the client does not need to know the content of the bookmark, other than the fact that it is used to uniquely identify a record of a table, and that it is a "record" bookmark as opposed to another type of bookmark as described below. When the client wants to modify a value of a field of a record, it sends to that application server a modify request that includes the new value of the field and the bookmark provided by the application server. When the application server receives the record bookmark, it identifies from the record bookmark the database table and the record of the database table to be modified. The application server then modifies its local copy of the identified record and eventually notifies the database server of the modification. In this way, the client and the application server have a synchronized view of the records of the database that are modified by the client. In a similar manner, the application server can notify the client of modifications it makes to records of a database table by sending a similar modification request to the client. In addition, since the bookmark is opaque to the client, the client need not be aware of which fields of database table are key fields. As a result, a developer can develop custom software without having to know which fields are actually key fields.

In some embodiments, when the client requests to modify the value of a key field of a record, the application server generates a new record bookmark based on the modified value of the key field. The application server then provides the new record bookmark to the client. When the client subsequently accesses that record, it identifies the record using the new record bookmark. The application server may provide a record bookmark to the client after each modification to the record even though the value of a key field is not modified. Because a record bookmark is provided after each modification, the client can process the modification of a key field in the same way as a non-key field, which means that the client need not be aware of which fields are key fields. In this way, the client has the correct bookmark to uniquely identify a record even though the value of a key field may have been modified.

In some embodiments, a client creates a draft bookmark when it wants to add a new record to a database table. The draft bookmark may be created on the client-side or may be requested from the application server. When the client sends a request to the application server to add a new record to a database table, the request includes a draft bookmark and values for fields of the record. Upon receiving the request, the application server may validate the field values of the new record (e.g., ensure its key is not a duplicate of another record in the database table). The application server may validate the new record by sending an add request to the database server to see if the new record can be added by performing a validation locally. If the new record is validated, the application server adds the new record to the database table identified by the draft bookmark and generates a record bookmark for the new record. The application server sends the newly generated record bookmark to the client for use by the client and subsequently identifies that new record.

In some embodiments, the application server generates a temporary bookmark to identify a record within a temporary table. The application server may generate a temporary table that contains records with values derived from records of various database tables. The application server may generate a temporary table based on a triggering event (e.g., the opening of a certain user interface form). The application server may generate a temporary bookmark for a record of the temporary table in a manner that may be somewhat similar to the manner in which a record bookmark is generated. In some embodiments, the temporary tables may be read-only tables. A client may use a temporary bookmark in a manner similar to how a record bookmark is used without having to distinguish between the different types of bookmarks.

In some embodiments, the application server may generate query bookmarks to identify records within the results of a query submitted to the database. A query bookmark includes a query identifier that identifies a query along with a record identifier that uniquely identifies a record within a result table that contains the query results. The query may be an SQL query. To generate a query bookmark, the application server submits the query to the database server and receives records of the query result in return. The application server generates a query bookmark that contains a query and a record (or multiple records) of the result table. The application server provides the query bookmark to a client. When the client wants to modify or re-retrieve a record of the query result, it sends the query bookmark to the application server. Upon receiving the query bookmark, the application server sends the query to the database server and stores the received query result in the result table. If the request is to re-retrieve the record(s) identified by the query bookmark, the application server retrieves the record from the result table and sends it to the client along with a query bookmark. If the request is to modify the record(s) identified by the query bookmark, the application server requests the database server to modify the record and then sends the client a new query bookmark that may account for any modifications made to the values of the key fields.

Figure 1:
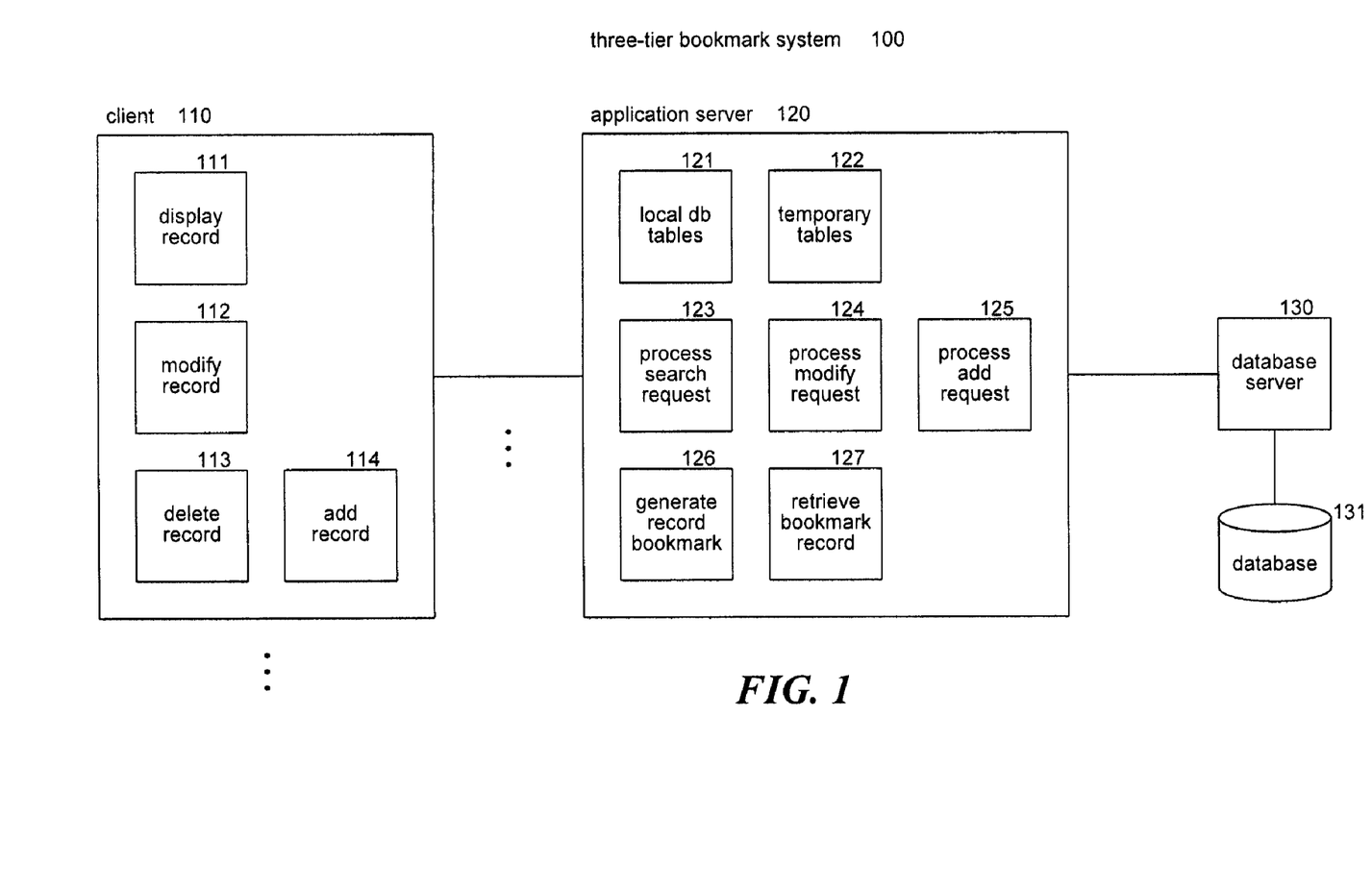
FIG. 1 is a block diagram illustrating components of an application server and a client of a three-tier bookmark system in some embodiments.

FIG. 1 is a block diagram illustrating components of an application server and a client of a three-tier bookmark system in some embodiments. The three-tier bookmark system 100 implements an ERP system with one or more clients 110 connected to an application server 120, which is connected to a database server 130. A client may implement the user interface aspects of the ERP system. The client may include a display record component 111, a modify record component 112, a delete record component 113, and an add record component 114. The display record component may retrieve records from the database via the application server and display those records to a user using various user interface forms. The display record component may also invoke the modify record component, the delete record component, and the add record component based on requests from the user.

The application server 120 includes local database tables 121, temporary tables 122, a process search request component 123, a process modify request component 124, a process add request component 125, a generate record bookmark component 126, and a retrieve bookmark record component 127. The application server may have a local database table for each database table of the database of the ERP system. The application server stores records that have been retrieved from the database server in the corresponding local database table. The temporary tables contain a table for each temporary table that has been created by the application server. The process search request component receives requests from clients to retrieve records. The component retrieves the records either from the local database tables or from the database, generates a bookmark, and returns the records and the bookmarks to the requesting client. The process modify request component is invoked when a client requests to modify a record identified by bookmark. The component modifies the record in the local database table (and eventually the database itself) and returns a regenerated bookmark to the client. The process add request component receives a request to add a record to a database table. The component adds the record to the database and the local database table and returns a record bookmark for the new record. The application server is also responsible for notifying the database server of changes to the records of the database tables made by the various clients and the application server itself. The application server may notify the database server at the time when the change is requested or at a later time. The generate record bookmark component generates record bookmarks for a record of a database table. The retrieve bookmark record component is invoked by passing a bookmark to the application server and returns to the record associated with that bookmark. The database server provides access to a database 131 of the ERP system.

Figure 2:
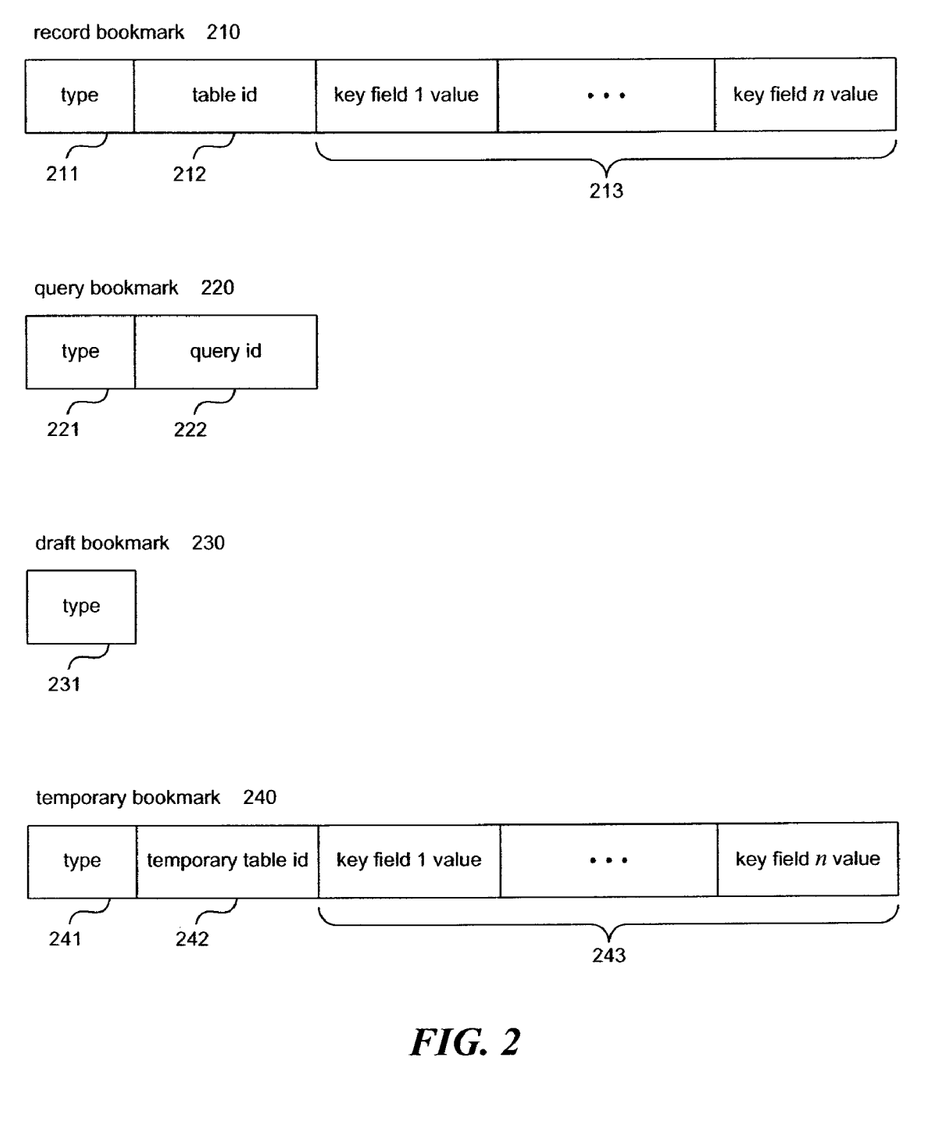
FIG. 2 is a block diagram that illustrates logical content of various bookmarks in some embodiments.

FIG. 2 is a block diagram that illustrates logical content of various bookmarks in some embodiments. A record bookmark 210 may include a type indicator 211, a table identifier 212, and values of key fields 213. The type indicator identifies the bookmark as a record bookmark. The table identifier identifies a database table. The values of the key fields uniquely identify a record within the identified database table. The values of the key fields may be stored as fixed-length data or may be each separated by a distinguished character. A query bookmark 220 may include a type indicator 221 and a query identifier 222. The type indicator identifies the bookmark as a query bookmark. The query identifier may contain the actual query or a reference to the query. In some embodiments, a query bookmark may have an offset that identifies one record of the multiple records in the result table. A draft bookmark 230 may simply include a type indicator 231 identifying that the bookmark is a draft bookmark. The draft bookmark may further include an identifier that uniquely identifies a record to the client. A temporary bookmark 240 may include a type indicator 241, a temporary table identifier 242, and the values of key fields 243. The type indicator identifies the bookmark as a temporary bookmark. The temporary table identifier identifies a temporary table of the application server. The values of the key field identify a record within the identified temporary table.

The computing devices on which the client, application server, and database server of the three-tier system are implemented may include a central processing unit, memory, input devices (e.g., keyboard and pointing devices), output devices (e.g., display devices), and storage devices (e.g., disk drives). The memory and storage devices are computer-readable media that may contain instructions that implement the three-tier system. In addition, the data structures and message structures may be stored or transmitted via a data transmission medium, such as a signal on a communications link. Various communications links may be used, such as the Internet, a local area network, a wide area network, or a point-to-point dial-up connection.

The client, application server, and database server of the three-tier system may be implemented or used in various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The component of the three-tier bookmark system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the principles of the three-tier bookmark system may be implemented on other multi-tier bookmark systems (e.g., two-tier or four-tier).

Figure 3:
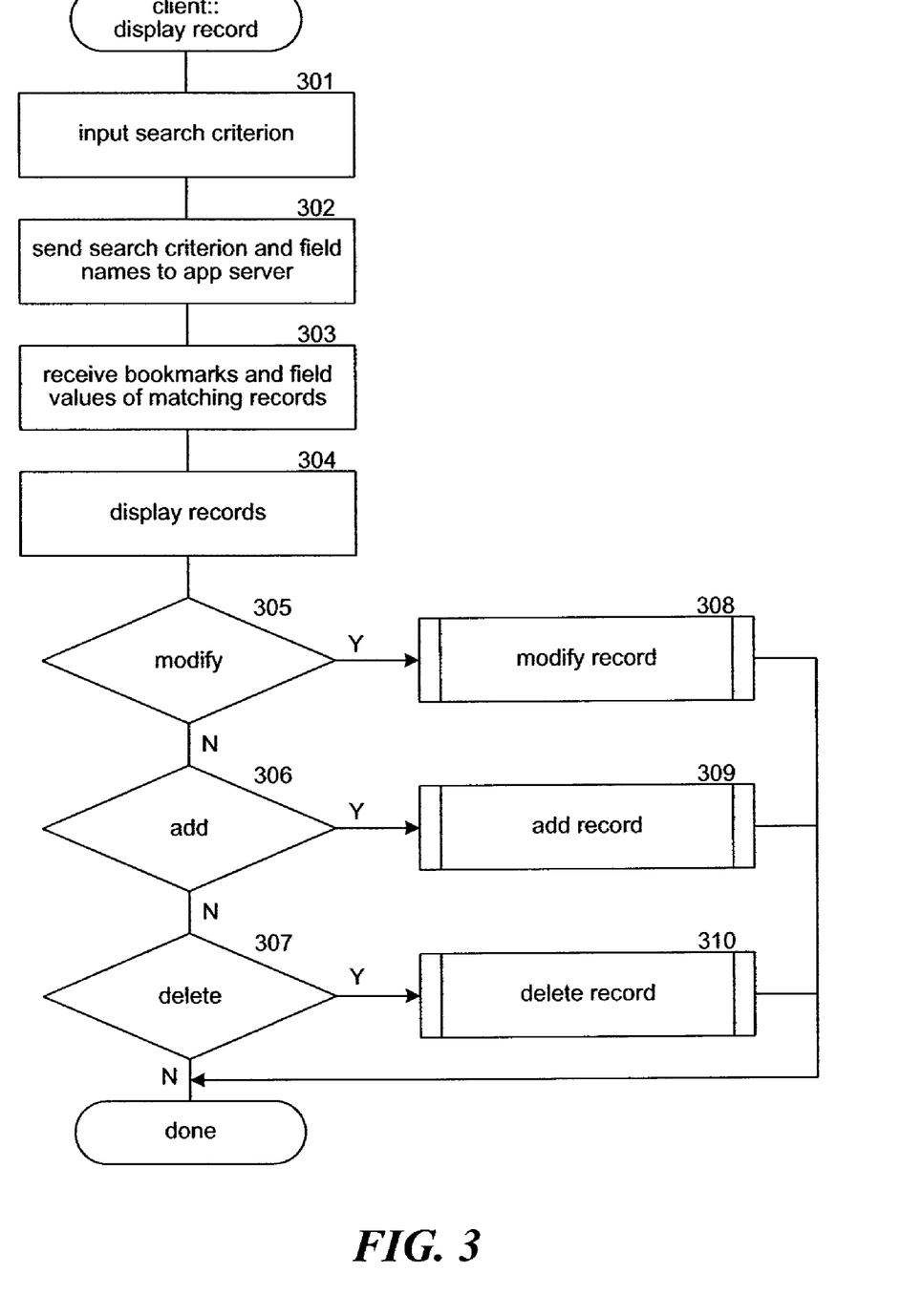
FIG. 3 is a flow diagram that illustrates the processing of a display record component of a client in some embodiments.

FIGS. 3-6 are flow diagrams that illustrate the processing of components of a client of a three-tier bookmark system in some embodiments. FIG. 3 is a flow diagram that illustrates the processing of a display record component of a client in some embodiments. The component inputs a search request from a user, retrieves the record(s) that satisfies the search request, and displays data of the record(s) to the user. The user may request to modify, add, or delete records. In block 301, the component inputs a search criterion from the user. For example, the search criterion may be to retrieve customer records with the customer name of "Acme." In block 302, the component sends to the application server a search request that includes the search criterion along with the names of the fields of the records whose values are to be returned. In block 303, the component receives the bookmark and field values for each matching record. In such a case, the bookmark may be a record bookmark. However, as described above, the client may be unaware of type of the bookmark that is provided by the application server. In block 304, the component displays the record(s) to the user using a user interface form. In response to input from the user, the component may determine whether the user wants to modify, add, or delete a record in decision blocks 305-307. If so, the component invokes the modify record component, the add record component, or the delete record component in blocks 308, 309, and 310, respectively. The component then completes.

Figure 4:
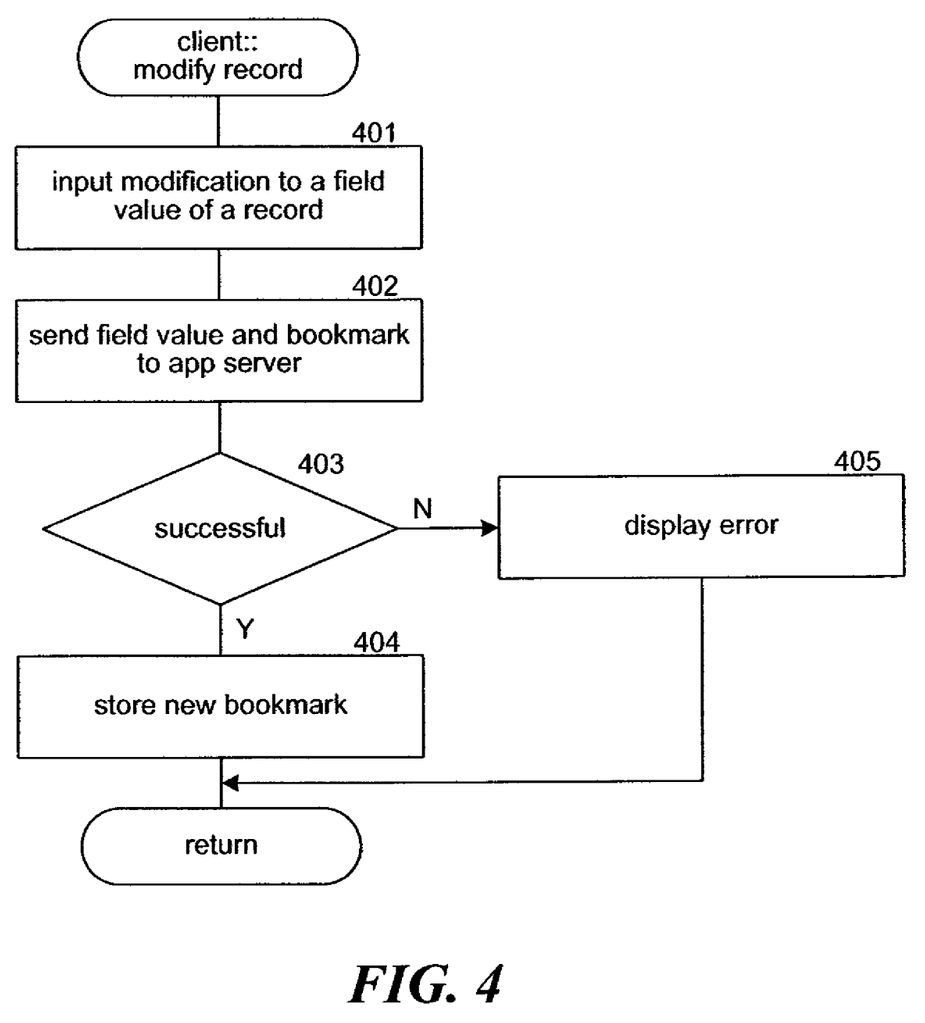
FIG. 4 is a flow diagram that illustrates the processing of a modify record component of a client in some embodiments.

FIG. 4 is a flow diagram that illustrates the processing of a modify record component of a client in some embodiments. The modify record component may be invoked by passing a bookmark to the application server identifying a record to be modified. In block 401, the component inputs the modification to be made to the field values of one more fields of the record. In block 402, the component sends to the application server a modify request that includes the new field values and a bookmark of the record. In decision block 403, if the response to the modification request indicates that the modification was successful, then the component continues at block 404, else the component continues at block 405. In block 404, the component stores the bookmark returned by the application server as a new bookmark for the modified record and then returns. In block 405, the component displays an error to the user and then returns. A modification may be unsuccessful if, for example, the application server or another client has modified a key field of the record or deleted the record.

Figure 5:
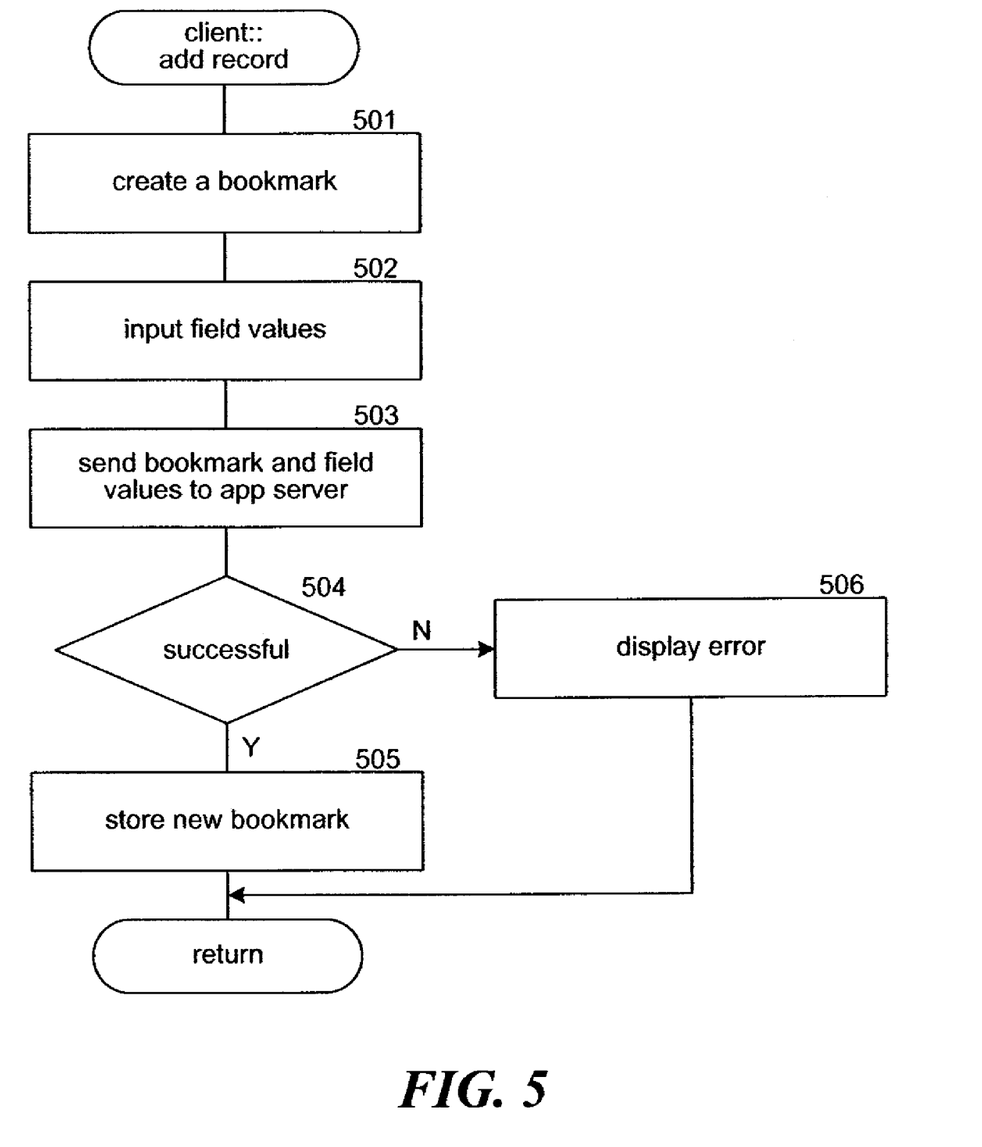
FIG. 5 is a flow diagram that illustrates the processing of an add record component of a client in some embodiments.

FIG. 5 is a flow diagram that illustrates the processing of an add record component of a client in some embodiments. The component inputs field values for the fields of the record to be added, creates a draft bookmark, and sends an add request to the application server. In block 501, the component creates a draft bookmark. In block 502, the component inputs from the user field values for the new record. In block 503, the component sends to the application server an add request containing the field values and the draft bookmark. In decision block 504, if the response to the add request indicates that the addition was successful, then the component continues at block 505, else the component continues at block 506. In block 505, the component stores the new bookmark for the new record and then returns. In block 506, the component displays an error to the user and then returns. The add request may be unsuccessful if, for example, the database already contains a record with the same field values in the key fields.

Figure 6:
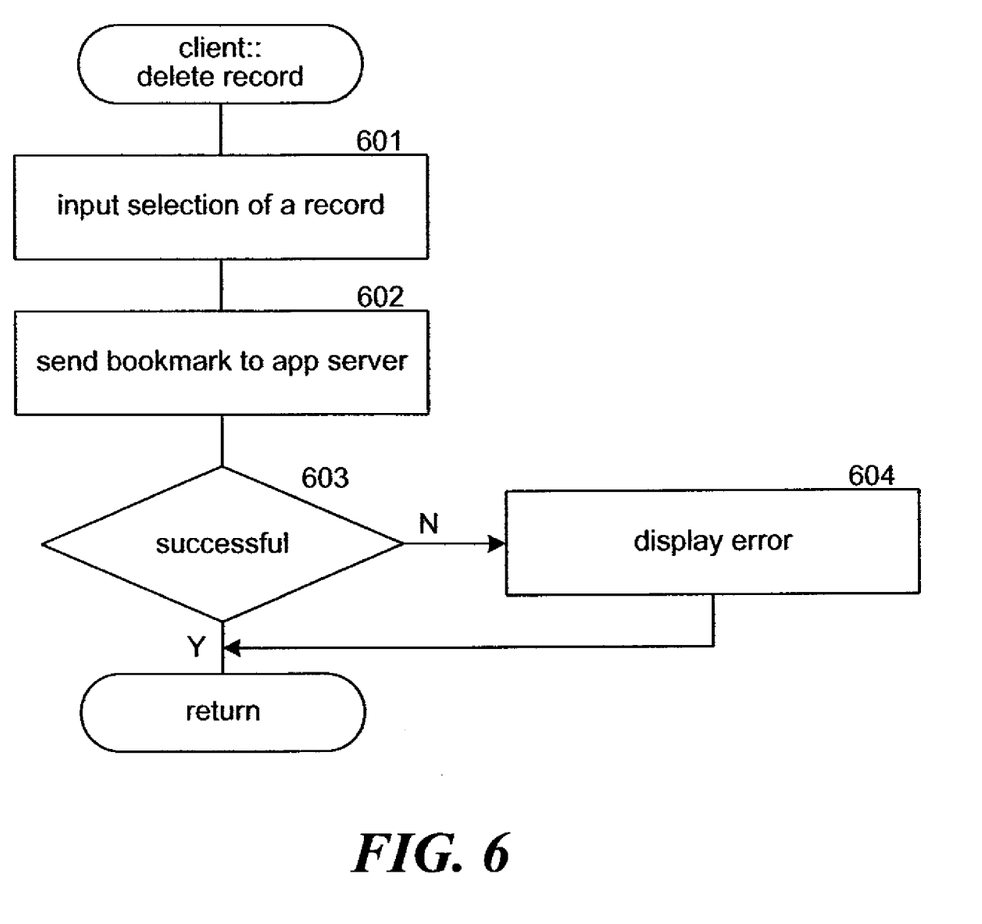
FIG. 6 is a flow diagram that illustrates the processing of a delete record component of a client in some embodiments.

FIG. 6 is a flow diagram that illustrates the processing of a delete record component of a client in some embodiments. The component requests the application server to delete a record identified by a bookmark. In block 601, the component inputs from user a selection of a record to be deleted. In block 602, the component sends to the application server a delete request along with a bookmark of the record to be deleted. In decision block 603, if the response to the request indicates that deletion was successful, then the component returns, else the component continues at block 604. In block 604, the component displays to the user an error message and then returns. A deletion may be unsuccessful if, for example, the application server or another client has modified a key field of the record or already deleted the record.

Figure 7:
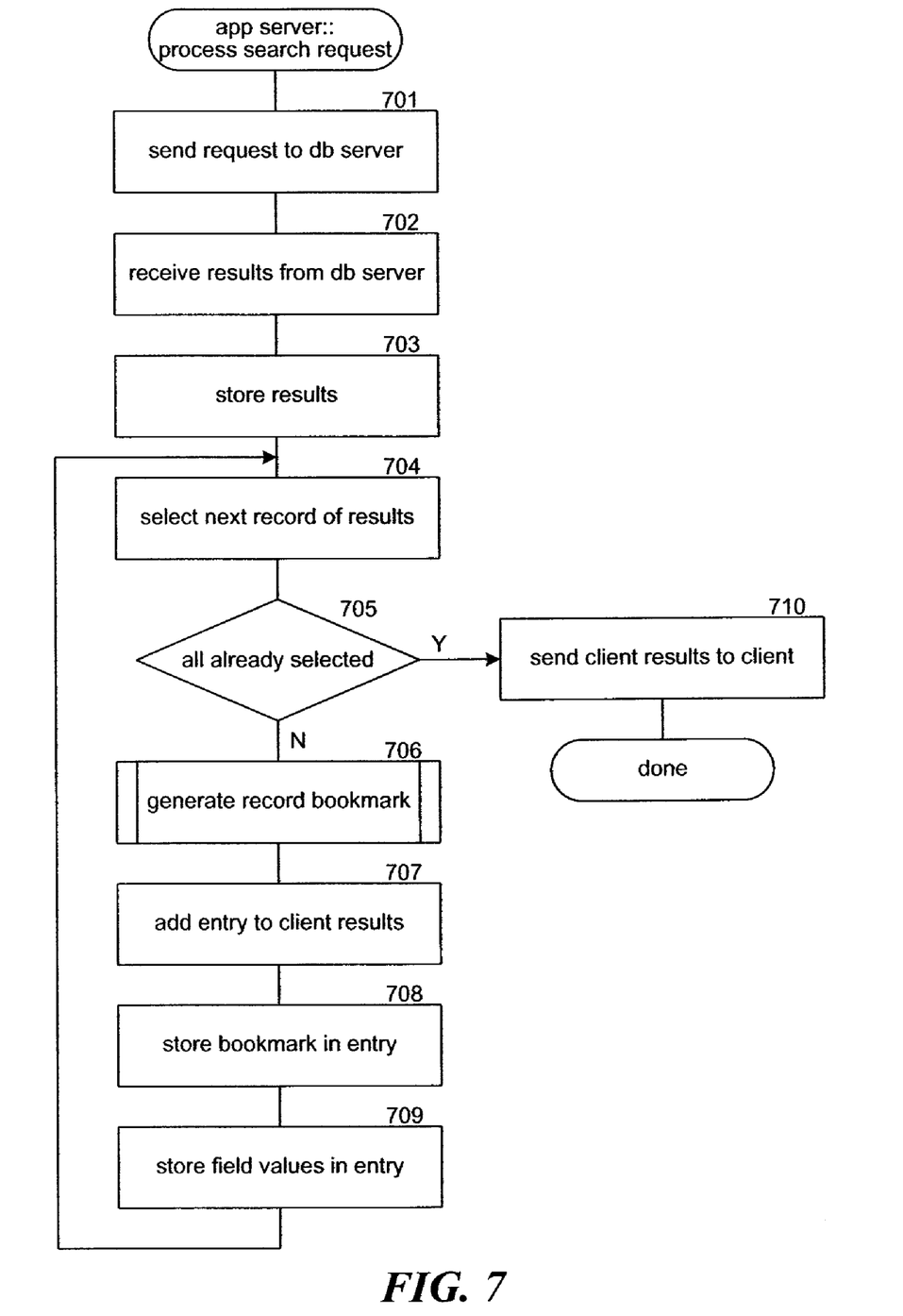
FIG. 7 is a flow diagram that illustrates the processing of a process search request component of an application server in some embodiments.

FIGS. 7-11 are flow diagrams that illustrate the processing of components of the application server in some embodiments. FIG. 7 is a flow diagram that illustrates the processing of a process search request component of an application server in some embodiments. The component is invoked when the application server receives a search request from a client. In block 701, the component sends to the database server a request for records that match the search criterion of the search request. In block 702, the component receives the results of the search request from the database server. In block 703, the component stores the result as records in a local database table. In blocks 704-709, the component loops, generating record bookmarks for the records of the results. In block 704, the component selects the next record of the result. In decision block 705, if all the records of the result have already been selected, then the component continues at block 710, else the component continues at block 706. In block 706, the component invokes the generate record bookmark component to generate a record bookmark for the selected record. In block 707, the component adds an entry to the result to be provided to the client. In block 708, the component stores the bookmark in the added entry. In block 709, the component stores the field values in the added entry. The component then loops to block 704 to select the next record of the result. In block 710, the component sends the client the result and then completes.

Figure 8:
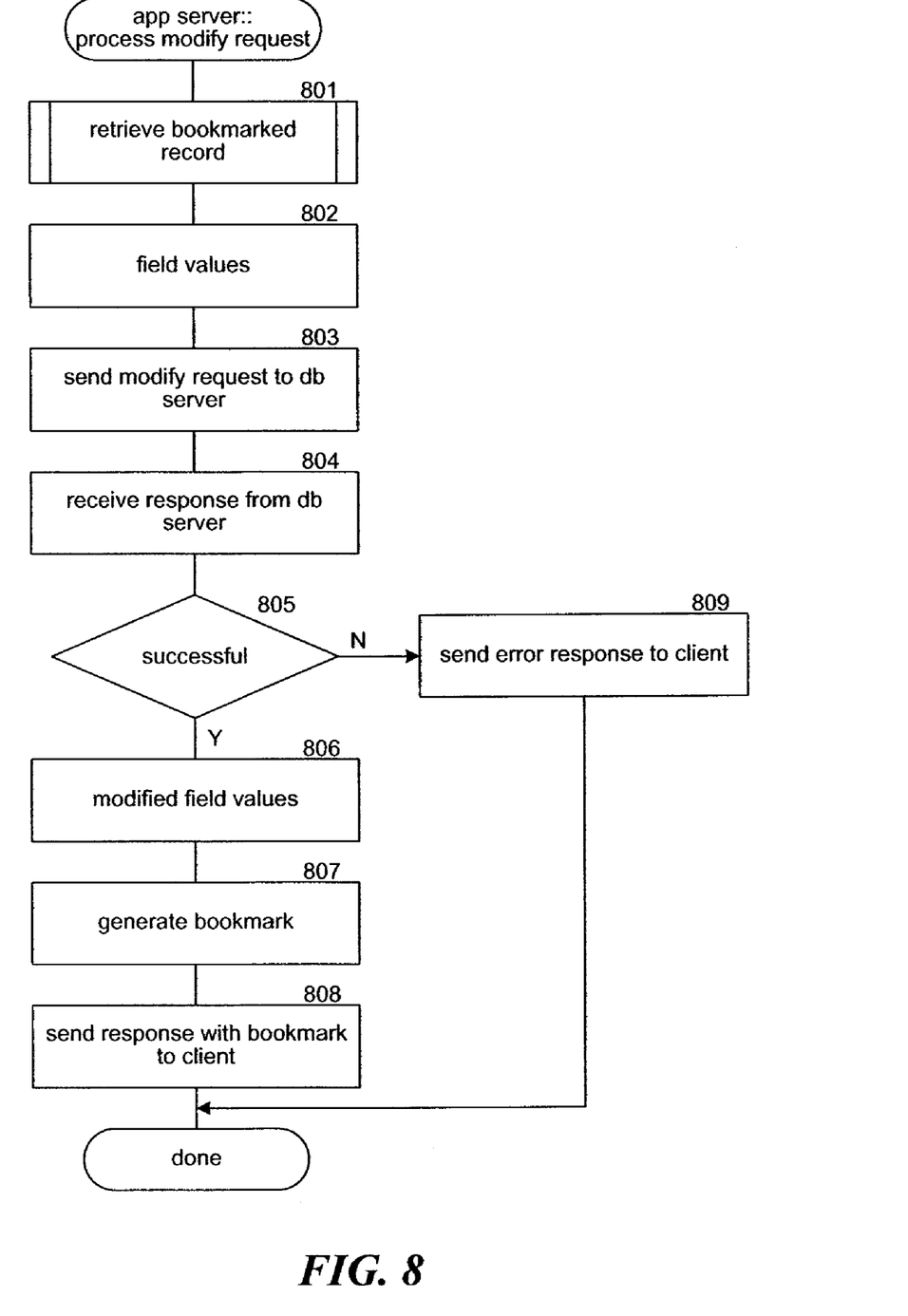
FIG. 8 is a flow diagram that illustrates the processing of a process modify request component of an application server in some embodiments.

FIG. 8 is a flow diagram that illustrates the processing of a process modify request component of an application server in some embodiments. The component is invoked when a request is received from a client to modify a record. In block 801, the component invokes the retrieve bookmarked record component to retrieve the record identified by the bookmark of the modify request. In block 802, the component retrieves the new field values for the modify request. In block 803, the component sends a modify request to the database server to modify the record as indicated. In block 804, the component receives a response from the database server. In block 805, if the modification was successful, then the component continues at block 806, else the component continues at block 809. In block 806, the component modifies the field values in the local tables. In block 807, the component generates a bookmark, which may be a query bookmark or a record bookmark. In block 808, the component sends to the client a response with the newly generated bookmark and then completes. In block 809, the component sends to the client a response with an error and then completes.

Figure 9:
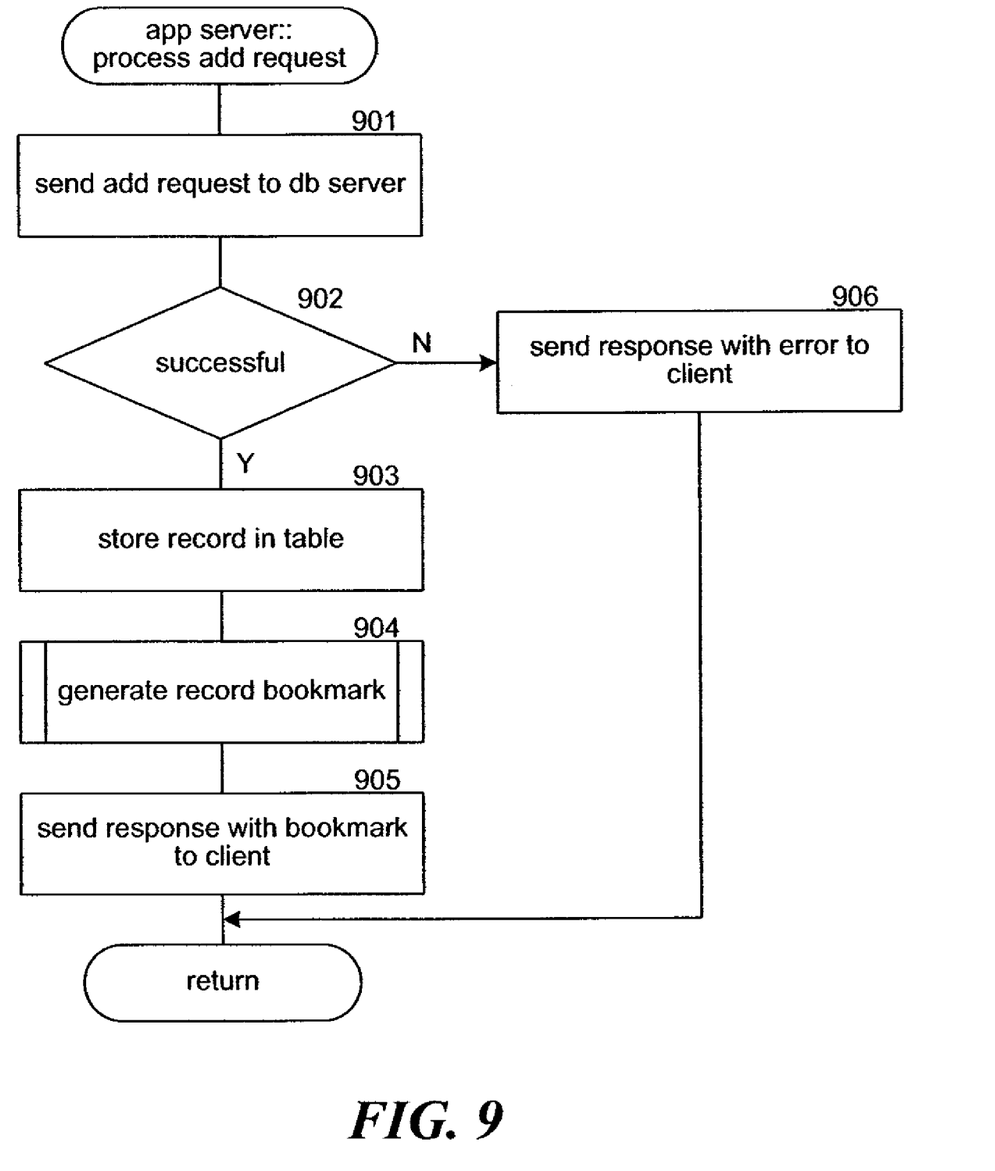
FIG. 9 is a flow diagram that illustrates the processing of a process add request component of an application server and some embodiments.

FIG. 9 is a flow diagram that illustrates the processing of a process add request component of an application server and some embodiments. The component is invoked when an application server receives an add request from a client. In block 901, the component sends to the database server an add request to add the record as requested by the client. In decision block 902, if the response indicates that the add request was successful, then the component continues at block 903, else the component continues at block 906. In block 903, the component stores the new record in the local database table. In block 904, the component invokes the generate record bookmark component to generate a record bookmark for the newly added record. In block 905, the component sends to the client a response with the newly generated bookmark and then returns. In a block 906, the component sends to the client a response with an error and then returns.

Figure 10:
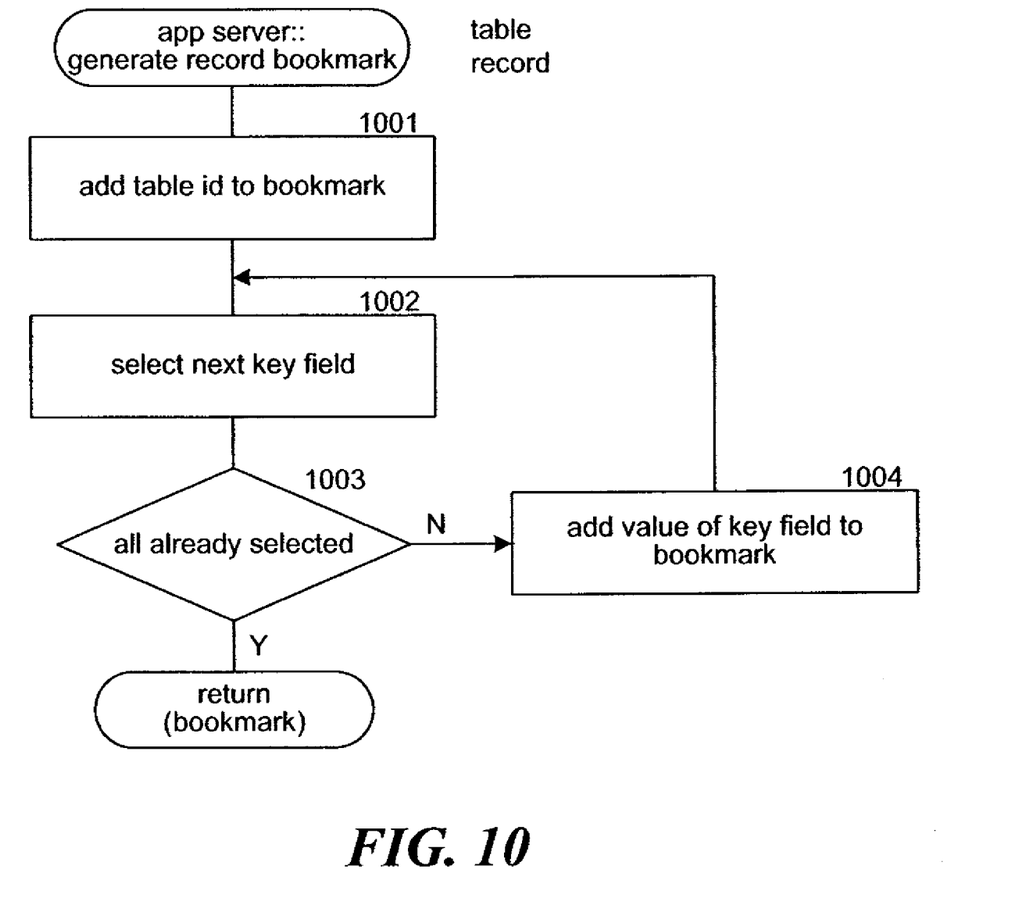
FIG. 10 is a flow diagram that illustrates the processing of a generate record bookmark component of an application server in some embodiments.

FIG. 10 is a flow diagram that illustrates the processing of a generate record bookmark component of an application server in some embodiments. The component may be passed an indication of a table and a record and returns a record bookmark. In block 1001, the component adds to the record bookmark a table identifier for the indicated table. In block 1002, the component selects the next key field of the table. In decision block 1003, if all the key fields have already been selected, then the component returns the bookmark, else the component continues at block 1004. In block 1004, the component adds the field value of the selected key field to the bookmark and then loops to block 1002 to select the next key field.

Figure 11:
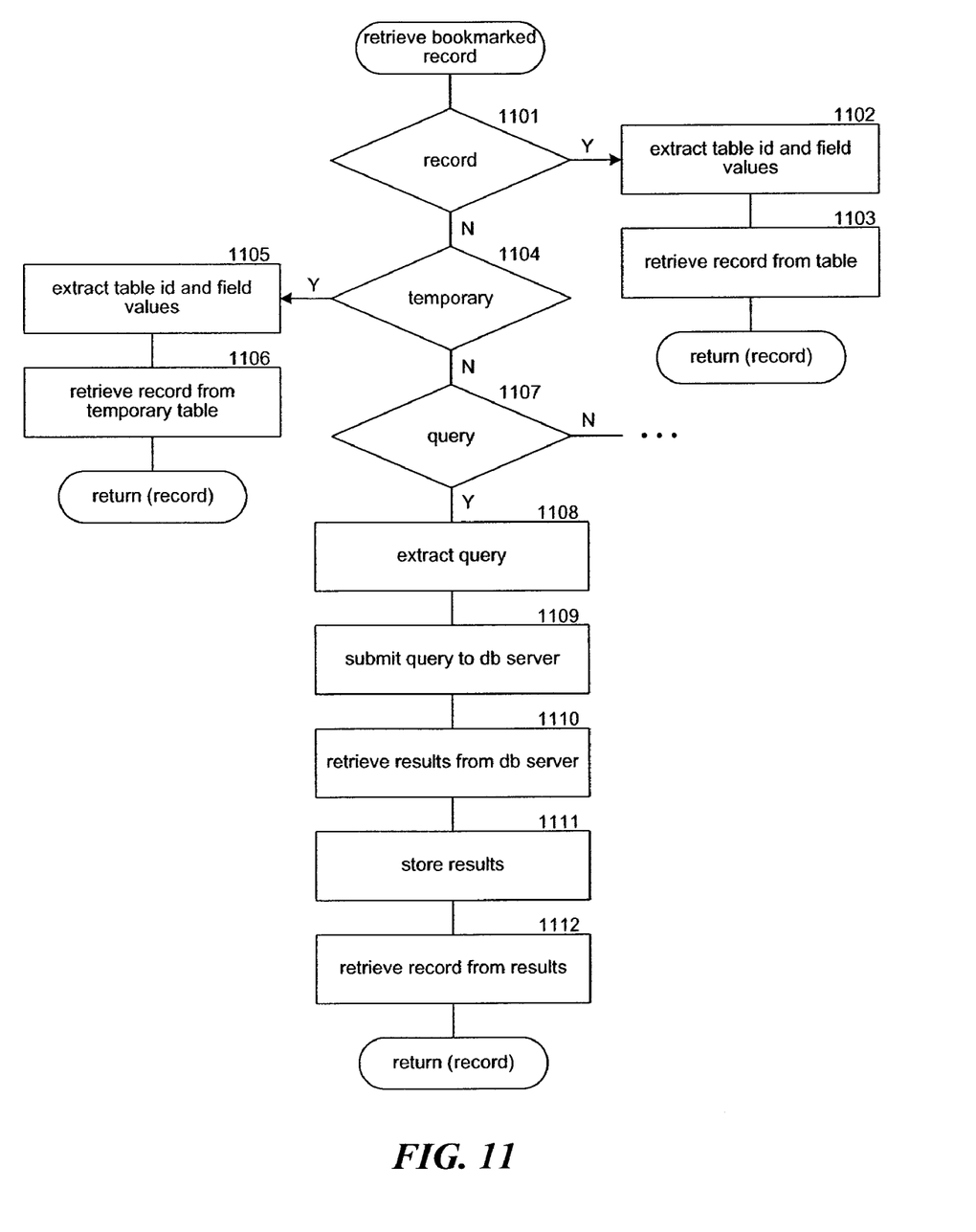
FIG. 11 is a flow diagram that illustrates the processing of a retrieve bookmarked record component of an application server in some embodiments.

FIG. 11 is a flow diagram that illustrates the processing of a retrieve bookmarked record component of an application server in some embodiments. The component is passed a bookmark, identifies the type to the bookmark, and retrieves the record identified by the bookmark. In decision block 1101, if the passed bookmark is a record bookmark, then the component continues at block 1102, else the component continues at block 1104. In block 1102, the component extracts the table identifier and field values from the bookmark. In block 1103, the component retrieves the identified record from the identified table and then returns the identified record. In decision block 1104, if the passed bookmark is a temporary bookmark, then the component continues at block 1105, else the component continues at block 1107. In block 1105, the component extracts the table identifier and field values from the temporary bookmark. In block 1106, the component retrieves the identified record from the identified temporary table and returns the record. In decision block 1107, if the passed bookmark is a query bookmark, then the component continues at block 1108, else the component continues with additional processing. In block 1108, the component extracts the query from the passed bookmark. In block 1109, the component submits the query to the database server. In block 1110, the component receives the result from the database server. In block 1111, the component stores the result in a result table. In block 1112, the component retrieves records from the result table that correspond to the records identified by the query bookmark and returns those records.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method in an application server for identifying records of database tables, the application server interfacing with a database server that persistently stores the records of the database tables and interfacing with one or more clients, the method comprising:
   receiving from the database server records of database tables, each database table having fields with field names and field values, one or more of the fields of each database table being a key field such that field values of key fields of a record of a database table uniquely identify the record within the database table;
   storing locally at the application server the received records in locally stored database tables;
   generating a record bookmark for each received record, the record bookmark containing a table identifier of the database table and a record identifier of the received record derived from the field values of the key fields of the received record such that a record bookmark uniquely identifies a database table and the received record within the database table and such that a record bookmark is changed when a field value of a key field of the received record changes;
   sending to clients record bookmarks and field values of fields of the received records, the record bookmarks being opaque to the clients;
   receiving from a client a request to modify a record of a database table, the request including a record bookmark of the record to be modified and a new field value for a field of the record;
   identifying a database table and a received record from the table identifier and the record identifier of the record bookmark;
   performing the requested modification to the locally stored identified record of the identified database table; and
   when the requested modification results in a change to a field value of a key field of the identified record,
      generating a new record bookmark for the identified record of the identified table using a changed field value; and
      sending the new record bookmark to the client so that the client has the correct unique identifier of the changed record for subsequent accesses to the changed record; and
   sending to the database server a request to modify the identified record of the identified database table, the request including a field value of a field of the record without sending the record bookmark
   wherein the client identifies a record of a database table using the record bookmark received from the application server and does not need to be aware of the key fields of the database tables of the database and
   wherein a request received from the client need not include field values of all key fields of a record to be modified.

2. The method of claim 1 including:
   receiving a request from a client to add a record to a database table, the request including a draft bookmark that uniquely identifies the record to be added to the database table and field values of fields of the record to be added;
   validating that the record can be added to the database table; and
   when the validation indicates that the record can be added to the database table, adding the record to the locally stored database table;
   generating a record bookmark for the added record; and
   sending to the client the record bookmark for use in subsequent accesses to the added record.

3. The method of claim 2 including:
   when the validation indicates that the record cannot be added to the database table, sending to the client a validation error.

4. The method of claim 1 including storing locally a mapping of record bookmarks to their corresponding records of database tables and not providing record bookmarks to the database server.

5. The method of claim 1 including generating a temporary table with records from records of the database tables and generating temporary bookmarks to uniquely identify records of the temporary table wherein the client uses record bookmarks and temporary bookmarks without having to distinguish between them.

6. The method of claim 1 including generating a query bookmark to identify a query to be performed on a database table and to identify records resulting from the query wherein the client uses record bookmarks and query bookmarks without having to distinguish between them.

7. The method of claim 6 including:
   receiving from the client a request to retrieve a record identified by a query bookmark;
   executing the query of the query bookmark to generate a result table; and
   sending to the client a record of the result table that is identified by the query bookmark.

8. The method of claim 1 wherein the application server includes applications that provide business processes to the clients.

9. A computing device providing an application server that provides application services to clients, the application services relating to the processing of records of a table, the table being persistently maintained by a table server, comprising:
   a memory storing computer-executable instructions of:
      a component that receives from the table server a record of the table, each record of the table having one or more key fields that uniquely identify the record within the table, the component storing the received record locally;
      a component that generates a record bookmark for a record of the table that contains a record identifier of the record derived from field values of the key fields of the record such that a record bookmark uniquely identifies the received record within the table such that a record bookmark is changed when a field value of a key field of the received record changes;
a component that sends to a client the record bookmark and field values of fields of the record wherein the record bookmark is opaque to the client;
a component that receives from the client a request to modify a record of the table, the request including a record bookmark of the record to be modified and a new field value for a field of the record;
a component that identifies the table and the record to be modified from a table identifier and the record identifier of the record bookmark included in the received request;
a component that performs the requested modification to the locally stored identified record, generates a new record bookmark based on the modification, and sends the new record bookmark to the client so that the client has the correct unique identifier for the modified record for subsequent accesses to the modified record; and
a component that sends to the table server a request to modify the identified record of the table, the request including a field value of a field of the record without sending the record bookmark
wherein the client identifies a record of the table using the record bookmark received from the application server and does not need to be aware of the key fields of the table; and
wherein a request received from the client need not include field values of all key fields of a record to be modified
a processor that executes the computer-executable instructions stored in the memory.

10. The computing device of claim 9 including:
a component that receives a request from a client to add a record to the table, the request including a draft bookmark that uniquely identifies to the client the record to be added and including field values of fields of the record to be added; and
a component that generates a record bookmark for the record to be added and sends to the client the record bookmark for use in subsequent accesses to the added record.

11. The computing device of claim 9 including a component that generates a temporary table with records and generates temporary bookmarks to uniquely identify records of the temporary table wherein the client uses record bookmarks and temporary bookmarks without having to distinguish between them.

12. The computing device of claim 9 including a component that generates a query bookmark to identify a query to be performed on a table and to identify a record resulting from the query wherein the client uses record bookmarks and query bookmarks without having to distinguish between them.

13. The computing device of claim 12 including a component that receives from the client a request to retrieve a record identified by a query bookmark, executes the query of the query bookmark to generate a result table, and sends to the client a record of the result table that is identified by the query bookmark.

14. A computer-readable storage device storing computer-executable instructions for controlling an application server to identify records of database tables, the application server interfacing with a database server that persistently stores the records of the database tables and interfacing with one or more clients, by a method comprising:
receiving from the database server records of database tables, each database table having fields with field names and field values, one or more of the fields of each database table being a key field such that field values of key fields of a record of a database table uniquely identify the record within the database table;
storing locally at the application server the received records in locally stored database tables;
generating a record bookmark for each received record, the record bookmark containing a table identifier of the database table and a record identifier of the received record derived from the field values of the key fields of the received record such that a record bookmark uniquely identifies a database table and the received record within the database table and such that a record bookmark is changed when a field value of a key field of the received record changes;
sending to clients record bookmarks and field values of fields of the received records, the record bookmarks being opaque to the clients;
receiving from a client a request to modify a record of a database table, the request including a record bookmark of the record to be modified and a new field value for a field of the record;
identifying a database table and a received record from the table identifier and the record identifier of the record bookmark;
performing the requested modification to the locally stored identified record of the identified database table; and
when the requested modification results in a change to a field value of a key field of the identified record,
generating a new record bookmark for the identified record of the identified table using a changed field value; and
sending the new record bookmark to the client so that the client has the correct unique identifier of the changed record for subsequent accesses to the changed record; and
sending to the database server a request to modify the identified record of the identified database table, the request including a field value of a field of the record without sending the record bookmark
wherein the client identifies a record of a database table using the record bookmark received from the application server and does not need to be aware of the key fields of the database tables of the database and
wherein a request received from the client need not include field values of all key fields of a record to be modified.

15. The computer-readable storage device of claim 14 including:
receiving a request from a client to add a record to a database table, the request including a draft bookmark that uniquely identifies the record to be added to the database table and field values of fields of the record to be added;
validating that the record can be added to the database table; and
when the validation indicates that the record can be added to the database table, adding the record to the locally stored database table;
generating a record bookmark for the added record; and
sending to the client the record bookmark for use in subsequent accesses to the added record.

16. The computer-readable storage device of claim 15 including:
when the validation indicates that the record cannot be added to the database table, sending to the client a validation error.

17. The computer-readable storage device of claim 14 including storing locally a mapping of record bookmarks to their corresponding records of database tables and not providing record bookmarks to the database server.

18. The computer-readable storage device of claim 14 including generating a temporary table with records from records of the database tables and generating temporary bookmarks to uniquely identify records of the temporary table wherein the client uses record bookmarks and temporary bookmarks without having to distinguish between them.

19. The computer-readable storage device of claim 14 including generating a query bookmark to identify a query to be performed on a database table and to identify records resulting from the query wherein the client uses record bookmarks and query bookmarks without having to distinguish between them.

20. The computer-readable storage device of claim 19 including:
receiving from the client a request to retrieve a record identified by a query bookmark;
executing the query of the query bookmark to generate a result table; and
sending to the client a record of the result table that is identified by the query bookmark.

* * * * *